Patented Feb. 17, 1942

2,273,012

UNITED STATES PATENT OFFICE 2,273,012

TREATMENT OF HYDROCARBON DISTILLATES

Wayne L. Benedict and Jacob Elston Ahlberg, Chicago, Ill., assignors to Universal Oil Products Company, Chicago, Ill., a corporation of Delaware No Drawing. Application January 30, 1939, Serial No. 253,618

8 Claims. (Cl. 196—31)

This invention relates to the treatment of hydrocarbon oils and more particularly to distillates of the motor fuel boiling range obtained by the cracking of heavy petroleum oils or the reforming of naphthas. In certain instances it may be applied to the treatment of straight-run distillates or distillates produced by cracking of tars obtained primarily from the destructive distillation of coals, shales, etc. More specifically, the invention constitutes a method of eliminating objectionable color, odor, sulfur and gum-forming constituents from untreated distillates which may reduce their saleability or result in damage to parts of automobile engines either before or after combustion.

In the past, it has been the practice in refining cracked distillates to subject them to various chemical treatments. In one of these, concentrated sulfuric acid is used followed by neutralization and redistillation in the presence of steam. After this the distillate may or may not require sweetening. This process yields a water-white product of sufficient storage stability and low sulfur content, but it also results in loss both in volume and anti-knock properties which adds a considerable amount to the overall cost of treatment.

Another development accomplishes the treatment in the vapor or liquid phase with fuller's earth and other natural earths. This process yields a water-white distillate, the stability of which can be regulated by the quantity treated per unit of earth, but it has practically no desulfurizing effect under the usual operating conditions, and requires a final sweetening step.

Another method of treatment is by means of inhibitors by which the sweetened but otherwise untreated distillate is stabilized in regard to its desirable properties by the addition of various compounds having the function of checking autoxidation and polymerization reactions. This results in increased storage stability and has proved to be of great value. However, it does not eliminate sweetening or change the sulfur content of the gasoline and is therefore not applicable to those gasolines whose sulfur contents are outside the commonly accepted range. Moreover, there are some gasolines which are very refractory and which require some form of treatment before they can be satisfactorily inhibited. Also, the market requirements in certain localities are such that a water-white gasoline is required.

In one specific embodiment the present invention comprises treating petroleum distillates of the gasoline boiling range at elevated temperatures and pressures with or without pretreatment of said distillates and/or simultaneous injection of hydrochloric acid, with a reagent comprising a synthetic, non-crystalline, silica-heavy metal hydrogel which is substantially alkali metal free, separating the refined distillate, and regenerating the spent hydrogel by steaming and/or burning with air to remove polymers and other carbonaceous materials therefrom.

The term "silica-heavy metal hydrogel" as used herein is understood to mean the type of reagent mass which results when a solution of a soluble silicate is treated with an acid and/or electrolyte to cause precipitation of a silica hydrogel, said operation being accompanied or followed by precipitation of a heavy metal hydroxide, shaping into granules or pellets, drying and calcining. The initial precipitation of the silica hydrogel may be accomplished in part by the addition of a salt of the heavy metal component of the final reagent.

The reagents of the present invention may be used to treat gasolines in either vapor or liquid phase at temperature conditions of 250–550° F. and pressures ranging from atmospheric to 300 pounds per square inch. The silica-zinc hydrogels are particularly useful in the process when hydrochloric acid is fed continuously with the distillate or when the distillate is pretreated with hydrochloric acid. The hydrogels used herein are not exactly equivalent in their effect, but all have more or less value when employed for the treatment of gasolines. We are aware of the use of natural metal silicates, such as zinc silicate ores, which are specified in United States Patent No. 1,970,284. However, the hydrogels used in the present process are synthetic and possess certain distinct advantages over the natural occurring minerals. For example, using zinc as an illustration, the composition of the hydrogels prepared by our method may be controlled so that the available zinc may be regulated as desired and the degree of treating controlled to a certain extent by the composition of the reagent. This cannot be done with the ores. Furthermore, the silica-zinc hydrogels employed in our present process are more effective treating agents because they are porous and have a high degree of active surface, thus differing from the metal silicate ores which are of massive, crystalline structure, and commonly used as lumps or granules. During the treating operation the metal in the mineral apparently reacts with constituents of the gasoline to form sulfides and other reaction products which tend to slough off, and, when mixed with the polymers formed by the treating reaction, to cause channeling or eventually plug the treating mass so that it has to be removed from the tower to separate the granular material remaining. In any event, the entire mass must be discarded after a time because the lumps are reduced to powdered form or coated with polymer to such an extent that the reagent is no longer usable. It is not the practice to regenerate this material and as a consequence the chemical cost is likely to be high.

The reagent of the present invention may be used in the form of granules or shaped particles or as a powder. The reagent is usually used until substantially spent and is then regenerated in a manner described later.

Of the hydrogels found useful in our process silica-zinc and silica-aluminum compounds are particularly well adapted for the intended purpose. Hydrogels of silica containing both zinc and alumina, or other metals with alumina or zinc are also useful and offer advantages in some instances.

In general, the reagents useful for this process may be produced by the coprecipitation of silica and heavy metal hydrogels by the addition of a salt of the metal to an aqueous solution of a soluble silicate or by the separate precipitation of the silica hydrogel and the metal hydroxide followed by mixing while still in the wet state. This treatment may be followed by filtration and suitable washing to remove the alkali metal ions. Another method is to precipitate the silica hydrogel, remove alkali metal ions by washing with dilute acid or solutions of ammonium chloride or heavy metal chlorides, followed by impregnation of the silica so formed either before or after drying with the heavy metal component of the final reagent by mixing the hydrogel with a solution of the salt of the metal in question, followed by precipitation by addition of a volatile base, such as ammonium hydroxide, hydrosulfide, or sulfide, or various organic bases.

As stated before the material may be used in the form of granules or of shaped particles. The granules are produced by compressing the slightly damp powder into briquettes or sheets followed by crushing and screening to whatever particle size is desired. Another method is to make pills or pellets from the powder. A still further method is to extrude the wet hydrogel and permit it to dry under controlled conditions. The use of slurries of powdered reagent has been mentioned and we usually employ powders passing 100 mesh or smaller for this purpose, although specific needs may indicate the use of coarser or finer powders.

When treating gasoline with granular reagents without hydrochloric acid being used, the gasoline to be treated is passed through a furnace, heated to some suitable temperature, within the range of say 250-550° F., and then passed through a bed of the reagent. The gasoline may be in liquid or vapor form depending on the temperature and pressure conditions employed. The pressure range used is from atmospheric to 300 pounds per square inch, although higher pressures may sometimes be desirable. The gasoline normally passes downward through the reagent bed and then to a fractionator where the treated gasoline and undesirably heavy fractions formed during treating are separated. The gasoline vapors pass overhead from the fractionator where they may be mixed with dilute caustic or ammonia to neutralize corrosive impurities, thence through a condenser, and into a receiver from which the gasoline passes to storage. At this point the gasoline is found to be colorless and with low gum content and high induction period. As the run progresses, however, the gum content increases although the color remains water white for a considerable time after the copper dish gum content has exceeded an allowable figure. In this case the treated gasoline may be inhibited and sent to storage, and the run continued until the color drops below the permissible value. Gasolines treated by this method are found to be exceptionally susceptible to the action of gum inhibitors the use of which in conjunction with the present process makes possible large through-puts per unit of reagent to produce gasoline of premium quality. The desulfurization obtained is comparatively small although in many cases the gasoline is sweet to the doctor test.

The hydrogels of silica and aluminium or silica-aluminium and other metal oxides, such as zinc, zirconium, etc., have been found especially useful for this type of operation.

When the reagent has ceased to function it has been found possible to restore it to its original activity by means of steaming. This operation can be repeated several times before the reagent becomes ineffective, after which it is possible to further regenerate by burning the reagent mass in the presence of controlled amounts of air to remove carbon and non-volatile hydrocarbonaceous materials which have deposited thereon, using temperatures in excess of 900° F. The reagent is then found to be of substantially the same activity as when freshly prepared. This operation can be repeated many times with little or no reduction in activity of the treating mass.

When desulfurization of a degree greater than can be obtained by the above procedure is desired or the gasoline is particularly refractory, we modify the method by either pretreating the gasoline with hydrochloric acid or by injecting hydrochloric acid into the system simultaneously with the gasoline. In this case we prefer to use silica-zinc hydrogels although we by no means limit ourselves to these particular ones.

It should be borne in mind that the present day standards of sulfur limitations are considerably different from those in effect prior to approximately 1928–1930 when a uniform specification for the sulfur content of gasoline was that it not exceed 0.1%. Since that time such requirements for domestic gasoline have been raised or removed entirely and at present many motor fuels on the market contain 0.15–0.25% and even 0.3% of sulfur or higher. It can be seen that the requirements for a desulfurization process are much less severe than they were in years past. Thus a process which will affect the reduction of sulfur content of a gasoline to bring it within the limits of say 0.15–0.3% is often satisfactory where previously such a process would have met with little or no success. A process such as the present one which eliminates many of the disadvantages of the sulfuric acid process, may now be extremely useful since it not only improves the other desirable properties of gasoline but effects partial desulfurization as well. Thus a gasoline which is slightly above the sulfur content which a refiner finds desirable for his market requirements, can be brought well within the sulfur specifications necessary without the attendant disadvantages of sulfuric acid treating. At the same time a product at least as good and often superior in regards to color, odor, color stability, storage stability, octane number and lead susceptibility is produced.

When utilizing hydrochloric acid in the process, the apparatus is similar to that described except that an acid charge pump and preheater must be added. The treating chamber is usually lined with or made of a copper alloy which is highly resistant to hot hydrogen chloride vapors. The hydrochloric acid treatment may be employed in either of two ways: In the first instance the preheated aqueous solution of the acid is passed into the treating chamber together with the gasoline. In the second case the gasoline is pretreated with concentrated hydrochloric acid, the sludge separated and the pretreated gasoline heated and charged to the reactor. In this case equipment for the acid pretreatment is needed. The same temperature and pressure ranges apply as in cases where hydrochloric acid is not used.

It has been found that slurries of powdered reagent can be employed either with or without the acid pretreatment. Where the pretreatment is used, the pretreated gasoline is mixed mechanically with the desired quantity of the powdered reagent and the two pumped through a heating coil under sufficient pressure to maintain the gasoline in the liquid phase and at sufficient velocity to keep the powder in suspension. When heated to the desired temperature they are passed through a reactor which may consist of a column with baffles or bubble plates, or through a vessel equipped with a mechanical agitator. Following this the mixture is passed to a fractionating column in which the vapors of gasoline are taken overhead and the high boiling reaction products together with suspended reagent are drawn off. The spent reagent is then separated from the liquid bottoms and can be regenerated by heat or steaming for further use in the process. When the sulfide and chloride content of the reagent has built up to a point where it can no longer be used the reagent may be treated with ammonium hydroxide and then burned in the presence of air. This results in the reagent being restored completely to its original activity and thus can be used over and over again.

While we prefer to use silica-zinc hydrogels when using hydrochloric acid in conjunction with this process, it has been found possible to use silica hydrogels of other metals, such as, for example, copper, tin, and aluminum as well. In some instances it is advantageous to use mixed silica hydrogels, such as those of zinc-alumina, or zinc-copper, etc. The following examples illustrate our invention, but should not be construed as limiting the process to the exact conditions given therein.

*Example 1*

A silica-alumina hydrogel was prepared by stirring into a solution of concentrated ammonia a solution of sodium silicate and adding this mixture to a solution of aluminum chloride ($AlCl_3.6H_2O$). The total mixture was then diluted with water and allowed to stand. It was filtered and the filter cake was washed with water containing ammonium chloride until free of alkali metal chlorides. The mixture was then dried, compressed into briquettes, the briquettes broken up, particles of approximately 6–10 mesh separated, and calcined at approximately 1000° F. The granular material was packed in a reaction tower and a West Texas-Mid-Continent gasoline having a +3 color and a very bad odor because of the presence of 0.1% mercaptan sulfur, and having a total sulfur content of 0.25%, and copper dish-gum of 166 mg. per 100 cc., was preheated to 450° F. and passed through the reaction tower at a pressure of 200 pounds per square inch. The pressure was reduced and the gasoline fractionated to separate it from high boiling reaction products. The finished gasoline had a color of 30+, copper dish gum of 10 mg. per 100 cc., and an oxygen bomb induction period of 100 minutes, which was increased to 240 minutes by the addition of 0.01% of a commercial inhibitor. The mercaptan sulfur content was 0.01% and the total sulfur had been reduced to 0.16%. A yield of 3000 barrels per ton of reagent was obtained of gasoline of these properties. By accepting a lower color and increasing the amount of inhibitor slightly this yield could be approximately doubled.

The reagent was heated in situ to 925° F. in the presence of air until carbon removal was substantially complete after which gasoline treating was resumed and a yield of an additional 3000 barrels of gasoline per ton of reagent was obtained.

*Example 2*

The reagent used in this example was made by precipitating silica hydrogel from sodium silicate solution by adding hydrochloric acid until the mixture was slightly acid to litmus. The resulting hydrogel was filtered and washed until it was alkali-metal free with water to which had been added a small amount of ammonium chloride. It was again filtered and stirred into a slurry, after which zinc chloride was added. After the mixture had been thoroughly agitated, ammonium hydroxide was added until the mixture was alkaline to litmus. It was then filtered and washed with water several times, dried at 300° F. and made into granules, after which the granules were heated to 932° F., and finally packed in a tower in a manner similar to that described in Example 1. The Mid-Continent-West Texas cracked gasoline was preheated to 450° F. and, together with two pounds of hydrochloric acid per barrel, was passed into the tower at a pressure of approximately 200 pounds per square inch. The gasoline then passed to the fractionating column where the finished gasoline was taken overhead and mixed with ammonium hydroxide in the vapor line in order to neutralize residual hydrochloric acid and prevent corrosion of the condenser. The finished gasoline was sent to storage. High boiling bottoms were drawn off and returned to the cracking plant for conversion into gasoline. The treated gasoline had 30+ color with 26 sunlight stability and an induction period of 360 minutes, copper dish gum of 2 mg. per liter, a total sulfur content of 0.15% and mercaptan sulfur content of 0.01%.

*Example 3*

The same reagent as used in Example 2 was used in this example, the only difference being that the gasoline was pretreated with 2 pounds per barrel of concentrated hydrochloric acid, the sludge separated, and the pretreated gasoline passed through the reagent. The properties of the treated gasoline in this case were, color 30+, sunlight stability 26, oxygen bomb induction period 380 minutes, and copper dish gum of 5 mg. per 100 cc. The gasoline was sweet after this treatment, and contained 0.14% total sulfur.

The reagent from this treatment eventually became spent to a degree where the results were not satisfactory. The yields obtained up to this point were in excess of 5000 barrels per ton of reagent. The reagent was heavily coated with carbonaceous material and a gummy residue and the active constituents were converted at least in part to a non-reactive form. The reagent was steamed to remove part of the residual oil and gum, and this was found to restore the activity for a short time. To completely regenerate it, the reagent was steamed, treated with a solution of ammonium hydroxide, partially dried, and burned in a stream of air at 925–950° F. to remove the carbonaceous material. The reagent was then found to have regained its original activity.

The above cited examples are given in support of the invention as described and are introduced to show its usefulness but are not to be construed as imposing limitations on the process to the exact conditions given, or to reagents prepared in exactly the manner described since these are but a few of the many obvious methods of preparation of the reagents, and of practicing our invention.

We claim as our invention:

1. A method for removing impurities from hydrocarbon oil which comprises treating the oil under refining conditions with hydrochloric acid and a calcined mixture of a silica hydrogel and a heavy metal hydrogel.

2. A method for removing impurities from hydrocarbon oil which comprises treating the oil under refining conditions with hydrochloric acid and a calcined mixture of a silica hydrogel, a heavy metal hydrogel and an alumina hydrogel.

3. A method for removing impurities from hydrocarbon oil which comprises treating the oil under refining conditions with hydrochloric acid and a calcined mixture of a silica hydrogel, a zinc hydrogel and an alumina hydrogel.

4. A method for removing impurities from hydrocarbon oil which comprises treating the oil under refining conditions with hydrochloric acid and a calcined mixture of a silica hydrogel and a zinc hydrogel.

5. A method for removing impurities from hydrocarbon oil which comprises treating the oil under refining conditions with hydrochloric acid and a calcined mixture of a silica hydrogel and an alumina hydrogel.

6. A method for removing impurities from hydrocarbon oil which comprises treating the oil under refining conditions with hydrochloric acid and a calcined mixture of a silica hydrogel and a copper hydrogel.

7. A method for removing impurities from hydrocarbon oil which comprises simultaneously subjecting the oil under refining conditions to the action of hydrochloric acid and a calcined mixture of a silica hydrogel and a zinc hydrogel.

8. A method for removing impurities from hydrocarbon oil which comprises treating the oil under refining conditions initially with hydrochloric acid and thereafter with a calcined mixture of a silica hydrogel and a zinc hydrogel.

WAYNE L. BENEDICT.
JACOB ELSTON AHLBERG.